United States Patent Office 2,737,318
Patented Mar. 6, 1956

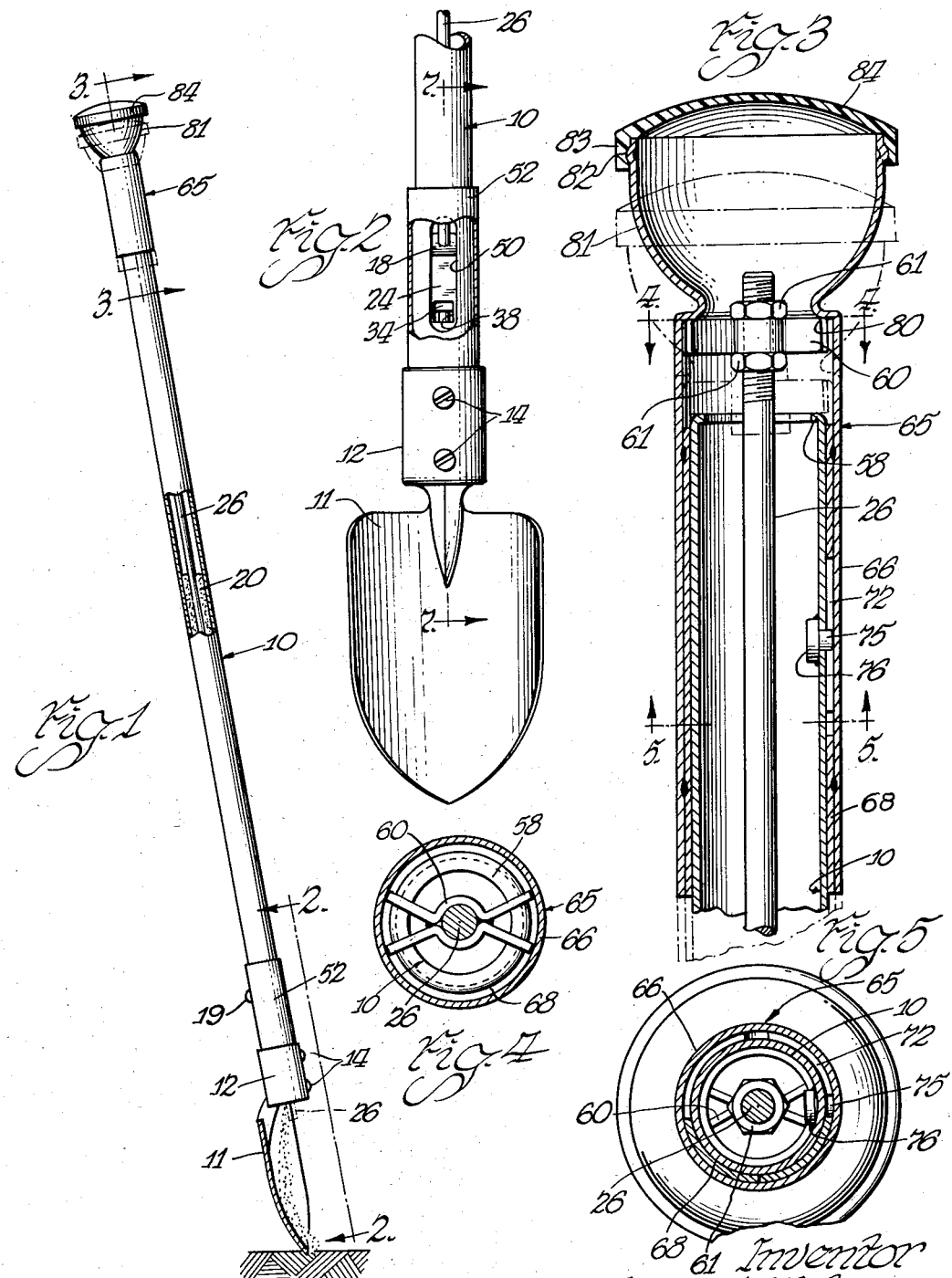

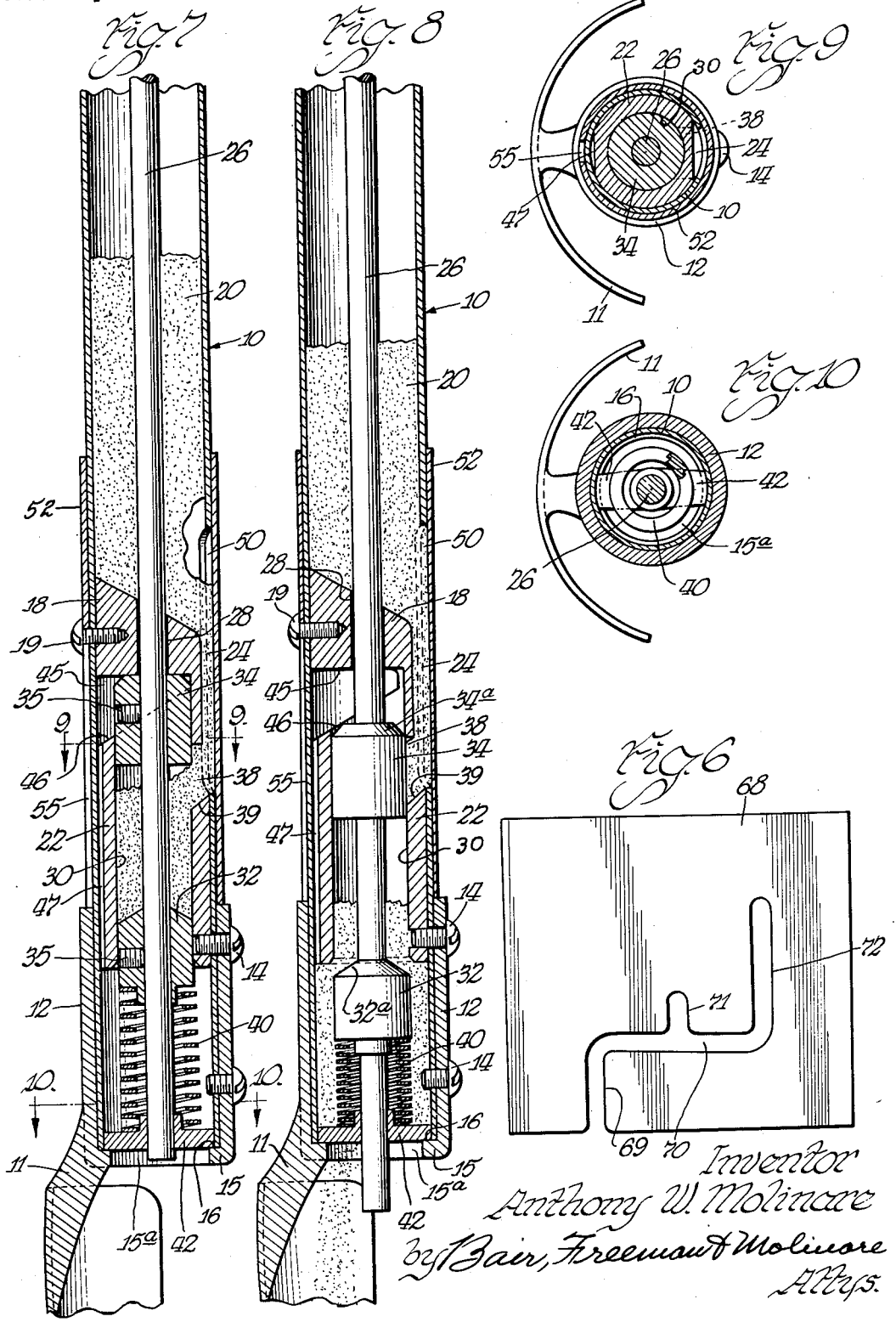

2,737,318

EARTH TILLING AND FERTILIZING TOOL

Anthony W. Molinare, Wilmette, Ill.

Application September 13, 1952, Serial No. 309,463

10 Claims. (Cl. 222—191)

This invention relates to earth working tools, and more particularly to long handle, hand type garden tools for loosening and tilling the soil around plants, flowers and shrubs. There are currently available numerous forms of long handle garden tools adapted for tilling or loosening the soil. In according proper care to small plants, flowers or shrubs, or where the stems or the trunks of such plants and the like are rather fragile or are apt to be easily injured or damaged, the usual practice for working the soil around such plants and the like is to employ a hand trowel. The use of a hand trowel in tilling the soil necessitates bending, squatting, or stooping, which frequently becomes a laborious task.

It is also the usual practice to apply fertilizer to certain plants and the like, from time to time, to insure proper growth and development of the fruits and flowers thereof. In the main, currently employed fertilizers are of the commercial variety, usually in granular form, such as, for example, "Vigoro" and "Millorganite" as well as bone meal and phosphates, in granular form. In order to insure obtaining the proper benefit from the use of such fertilizers, as is well known, the fertilizer must be worked into the soil around the plants, flowers and shrubs. Because of the characteristics of certain of such commercially available fertilizers, care must be exercised to avoid injury or damage to the stem or trunk of certain plants, flowers and shrubs by direct contact of the fertilizer therewith. Hence, the task of fertilizing certain plants, flowers and shrubs frequently becomes laborious, consuming a substantial amount of time and care, and also necessitates a substantial amount of physical exertion incident to bending, stooping, squatting and twisting of the body of the person in performing the work.

It is therefore a primary object of this invention to provide a novel combination earth tilling and fertilizing tool, by virtue of which plants, flowers and shrubs may be quickly and easily fertilized, simultaneously with the performance of the operation of tilling the soil in a usual manner, around such plants and the like.

Another object is to provide a novel gardening tool of the character indicated, which is constructed and arranged so as to permit convenient tilling of the soil around plants or the like, and which also permits performance of the fertilizing operation around such plants or the like by a person in standing or upright position.

A further object is to provide a novel gardening tool of the character indicated, which is constructed and arranged for dispensing a measured quantity of granular fertilizer each time the tool is moved in one direction during the normal use thereof in working or tilling the soil.

Still another object of this invention is to provide a novel gardening tool of the character indicated, which permits proper and relatively accurate placement of fertilizer relative to the stem or trunk of a plant or the like, incident to tilling the soil in a usual manner by a person in standing or upright position.

A still further object is to provide a novel gardening tool of the character indicated, having a handle of substantial length, permitting convenient use of the tool by a person in standing or upright position, wherein the handle is of hollow formation to constitute a fertilizer storage chamber, and having manually operable valve means for dispensing measured quantities of fertilizer in the zone of operation of the tool, incident to use of the tool in a normal manner for tilling the soil.

And still another object is to provide a novel gardening tool of the character indicated, which is of simple and durable construction, efficient in use, and which is capable of being economically manufactured.

Other objects and advantages of this invention will be apparent from the following description, taken in connection with the accompanying drawings, in which:

Figure 1 is a side elevational view of the tool embodying the present invention, with portions broken away to show details of construction.

Figure 2 is an enlarged, fragmentary, face view of the lower portion of the tool, with portions broken away to show details of construction, and taken substantially as indicated at line 2—2 on Figure 1.

Figure 3 is an enlarged, axial sectional view, through the upper portion of the tool, taken substantially as indicated at line 3—3 on Figure 1.

Figures 4 and 5 are transverse sectional views through the upper portion of the tool, taken substantially as indicated at lines 4—4 and 5—5, respectively, on Figure 3.

Figure 6 is a developed plan view of the control member of the movable head of the tool, by virtue of which the tool may be rendered either operative or inoperative with respect to dispensing of fertilizer.

Figure 7 is an enlarged, axial sectional view, of the lower portion of the tool, taken substantially as indicated at line 7—7 on Figure 2.

Figure 8 is an enlarged axial sectional view similar to Figure 7, showing the valve mechanism in operating position of adjustment for dispensing a measured quantity of fertilizer.

Figures 9 and 10 are transverse sectional views through the lower portion of the tool, taken substantially as indicated at lines 9—9 and 10—10, respectively, on Figure 7.

The tool embodying the present invention comprises a hollow tubular handle 10, to the lower end of which is detachably connected an earth working implement 11. It is to be understood that the handle may be formed of any suitable material, such as metal or various types of plastic or fibrous material of a character to provide adequate strength for the use of the tool in the normal and intended manner. Preferably, the handle 10 is of a diameter which permits convenient grasping by the hands of the user, such as in the general range of 1⅛" diameter. The overall length of the tool preferably is such as to permit convenient use thereof by a person in standing or upright position.

The earth working implement 11, as herein shown, is in the nature of a trowel or small sized spade, the upper end of which is formed with a tubular sleeve 12 for a snug telescopic fit over the lower end of the handle 10, to which it is detachably secured by screws 14. The lower end of the tubular sleeve is formed with an inturned annular flange 15, forming a fertilizer discharge opening 15a, and providing a shoulder 16, against which the lower end of the tubular handle 10 is adapted to abut, so that forces in the normal use of the tool are transmitted directly from the implement to the handle and vice versa.

Rigidly secured within the lower end of the tubular handle 10, as seen in Figures 7 and 8 of the drawings, is a baffle 18 which is secured in place by a screw 19 extending through the wall of the tubular handle. The portion of the interior of the handle above the baffle 18 constitutes a storage chamber for granular fertilizer, indicated at 20. As may be seen in the drawings, said baffle is shown as an integral part of a hollow valve body 22, which substantially occupies the cross-sectional area of the interior of the handle, below said baffle. The baffle element and the upper portion of the valve body are cut away, at one side thereof, as may be clearly seen in Figures 7, 8 and 9 of the drawings, to form a vertical passageway 24, adjacent the inner wall of the tubular handle. The upper surface of the baffle 18 is sloped at an acute angle, in a downward direction, toward the passageway 24 to facilitate free flow of the granular fertilizer from the storage chamber into the passageway 24.

Mounted substantially centrally in the tubular handle 10, is a valve operating rod 26, which extends freely through an opening 28, formed in the baffle 18, and terminates at its lower end adjacent the bottom of the sleeve 12 of the earth working implement, as seen in Figure 7 of the drawing. The valve body 22 is provided with a central bore 30 and fixedly mounted on said rod, for a snug, guided fit within the bore of the valve body, are a pair of axially spaced-apart valve members 32 and 34 which are rigidly fixed in position on the rod by set screws 35. When the valve members and operating rod 26 are in a normally closed position, they assume the position and relationship as seen in Figure 7 of the drawings, at which position the valve member 34 abuts against the underside of the baffle 18, and the valve member 32 is positioned a short distance upwardly within the bore of the valve body. The side wall of the valve body is cut away to provide an inlet opening 38, in communication with the passageway 24, so that the granular fertilizer feeding from the storage chamber, at the upper part of the handle, feeds downwardly through said passageway 24 into the interior of the valve body, between the valve members 32 and 34, as seen in Figure 7 of the drawings. The edge of the valve body, defining the lower edge of the opening 38, is inclined downwardly and inwardly, as indicated at 39, to facilitate free flow of the fertilizer into the valve body. The chamber in the valve body, between the valve members 32 and 34, thus constitutes a measuring chamber for containing a predetermined amount of granular fertilizer for dispensing each time that the tool is actuated, as will hereinafter be described.

The rod 26, with the valve members 32 and 34 fixedly secured thereon, is yieldingly maintained in a closed position of adjustment, as seen in Figures 3 and 7 of the drawings, by a spring 40, surrounding the lower portion of said rod and seated at its upper end against the underside of the valve member 32, with its lower end supported on a bar type seat member 42, supported upon the shoulder 16 of the annular flange 15, at the lower end of the implement sleeve 12. It has been found that by feeding the granular fertilizer into the measuring chamber, through the side wall thereof, continuous and efficient operation of the valve structure is insured without jambing or becoming blocked, as frequently occurs when the granular fertilizer is fed substantially axially from the storage chamber into the measuring chamber.

Because commercial fertilizer does contain a certain amount of relatively small particle size material, a quantity of such powder-like material tends to feed downwardly along the rod 26, through the baffle 18. To avoid possible buildup of such material to an extent which would cause a binding action, there is provided in the unitary baffle and valve body a cutaway portion, as indicated at 45, to allow free flow of such powder-like material, passing through the baffle, incident to reciprocation of the rod 26. The upper end of the valve member 34 is chamfered, as indicated at 34a, to facilitate lateral flow of such powder-like material, and the lower wall, defining the opening 45, is inclined downwardly, as indicated at 46, and opens into a vertical passageway, 47, adjacent the wall of the handle. Said passageway is formed by a cutaway of a portion of the valve body, opposite the opening 38, so that such small particles of fertilizer, as may be carried through the baffle wall, are discharged outside of the valve mechanism, through the opening 15a at the lower end of the implement sleeve 12.

To facilitate free flow of the granular fertilizer out of the measuring chamber of the valve body, when the valve members are moved to operating position, as seen in Figure 8 of the drawings, the upper surface of the valve member 32 is chamfered, as indicated at 32a, to assist in directing the fertilizer in a lateral direction for discharging through the opening 15a at the end of the handle.

The presence of large size particles of fertilizer in the passageway 24 may tend to block or impede free flow of fertilizer from the storage chamber into the measuring chamber. To permit quick and easy elimination of such blocked condition, the side wall of the tubular handle 10 is provided with an elongated opening 50, opposite the baffle 18, the passageway 24, the upper portion of the valve body 22, and its inlet opening 38, to permit convenient access to the valve mechanism. Surrounding the lower portion of the tubular handle 10, is a tubular sleeve 52, the lower end of which normally abuts the upper end of the sleeve 12 of the implement 11, and in such position it totally covers the opening 50 in the side wall of the handle. The sleeve 52 may be dimensioned for a snug frictional fit on the tubular handle, and may be provided with an elongated slot 55, in registration with the screw 19 which holds the baffle and valve body in position so that the marginal portion of material, at the upper end of the slot 55, is seated beneath the head of the screw 19. By a slight turn of the screw 19, the pressure may be released so that the sleeve 52 may be freely moved upwardly along the handle 10, to expose the opening 50 therein.

The upper end of the tubular handle 10 is formed with an inwardly extending annular shoulder 58, constituting an abutment or stop to limit axial movement of a spider-type abutment 60, mounted on the upper end of the rod 26, between a pair of nuts 61. Telescopically mounted on the upper end of the tubular handle is a reciprocable head 65, comprising a tubular sleeve portion 66, positioned for telescopic movement over the upper end of the handle 10. Mounted within the sleeve portion 66 is a control member 68, which is initially formed as a plate, as seen in Figure 6 of the drawing, and is subsequently rolled into a tube and fitted within the sleeve 66, and rigidly secured therein in any convenient manner, such as by spot welding. The member 68, when in place, terminates flush with the lower end of the sleeve portion 66 of the head, and is formed with an upwardly extending slot 69, which is open at its lower end, the upper end continuing into a transversely extending slot 70, off of which open two upwardly extending slots 71 and 72. These slots 69, 70, 71 and 72 constitute guideways for a pin or nubbin 75, extending through the wall of the upper portion of the handle 10, as seen in Figures 3 and 5 of the drawings. This nubbin is secured in place by reason of having its head 76, seated against the inner surface of the wall of the handle, and brazed or otherwise secured in position. It is to be understood that the slots 69, 71 and 72 are spaced approximately 90° apart when the plate 68 is rolled in the form of a tube. The purpose of the slot 69 is to permit initial connection of the head to the handle, and after the head has been moved down on the handle the pin or nubbin registers with the transverse slot 70, and by rotating the head a quarter turn, the head is permitted to drop so that the nubbin 75 seats in the upper end of the slot 71. In this position of adjustment of the parts, the rod and valve mechanism is incapable of actuation. When it is desired that the head be adjusted so that the rod and valve mechanism may be actuated to dispense fertilizer, said head is raised until the nubbin 75 again registers with slot 70 and the head again rotated in the same direction another 90°, until the nubbin registers with the upright slot 72.

The upper end of the tubular head is formed to provide an inwardly extending annular abutment or stop 80, which continues into an outwardly flared body portion 81, in the general form of a funnel, which assists in directing fertilizer into the storage chamber of the handle in the process of filling said chamber. The upper edge of the funnel shaped portion 81 is provided with a plurality of circumferentially spaced, outwardly extending embossments 82, over which is snap fitted the skirt portion 83 of a cap or cover member 84, which is preferably formed of resilient material, such as for example, rubber or polyethylene.

It is to be understood that normally the spring 40 maintains the valve members and the rod 26 with the abutment 60, in the position as seen in Figures 3 and 7 of the drawings. When the head is rotated to a position at which the nubbin 75 is seated in the upper end of the slot 71 of the control tube 68, of the head, said head is limited against downward telescopic movement with respect to the handle and, hence, the tool may conveniently be used in a normal manner for tilling of the soil without dispensing fertilizer. When, however, it is desired to dispense fertilizer, the head 65 is raised until the slot 70 registers with the nubbin 75, and is rotated a quarter turn until the nubbin registers with the slot 72, at which time said nubbin 75 is disposed approximately midway of the length of the slot 72, and the abutment shoulder 80 of the head rests upon the spider abutment 60. In using the tool in the normal manner for tilling the soil, with head positioned with slot 72 in registration with the nubbin 75, each time downward pressure is exerted on the tool, with one hand resting on the movable head 65, said head is telescoped downwardly on the handle, imparting movement through the spider abutment 60 to the rod 26 and thereby shifting the valve members 32 and 34 to the position seen in Figure 8 of the drawings, against the reaction of the spring 40. As a result of such movement of the head a measured quantity of fertilizer, contained in the chamber of the bore of the valve body between the said valve members is discharged through the opening 15a at the lower end of the handle. The fertilizer freely discharges over the upper end of the valve 32, around the spring 40, and at each side of the valve seat member 42, through the opening 15a. In the normal use of the tool, the fertilizer is caused to be discharged against the working face of the implement 11, as seen in Figure 1. When pressure is released on the movable head 65, the springs 40 returns the valve members and rod assembly to the position seen in Figures 3 and 7 of the drawings, simultaneously returning therewith said head to the position seen in Figure 3 of the drawings. As the valve mechanism is moved downwardly in the manner referred to, the upper valve member 34 moves to a position to close the opening 38 in the valve body, during the time that the measured quantity of fertilizer within the valve body is being discharged.

When using the tool, with head 65 adjusted for a dispensing operation, it is not necessary to exert sufficient downward pressure on the movable head for operating the valve mechanism, during each single stroke of use of the tool in the normal manner of tilling the soil. Such pressure as necessary for actuation of the valve mechanism need be applied only when it is desired to dispense fertilizer. If desired, however, pressure may be applied to the head on each downstroke of the tool to actuate the valve mechanism and dispense, on each downstroke, a measured quantity of fertilizer. When it is desired that the tool be employed for normal use, without dispensing of fertilizer, the movable head 65 may be adjusted, as above described, so as to dispose the nubbin 75 in the slot 71 of the control member 68, to prevent movement of the head and actuation of the valve mechanism in the normal use of the tool.

While I have herein shown and described a form of implement for the tool in the nature of a trowel or small spade, it will be apparent that various other types of implements may be employed in lieu of the trowel, such as for example, heads in the nature of a hoe, a tined cultivator, or a small fork.

By virtue of the present invention, considerable labor and effort is saved in the normal operation of tilling the soil around certain plants, flowers or shrubs, as well as in fertilizing plants and the like. By virtue of the tool embodying the present invention, the application of fertilizer to plants and the like, may be accurately controlled so as to insure against possible damage or injury to the stems or trunks of delicate plants and the like.

Although I have herein shown and described a preferred embodiment of my invention, manifestly it is capable of modification and rearrangement of parts, without departing from the spirit and scope thereof. I do not, therefore, wish to be understood as limiting this invention to the precise form herein disclosed, except as I may be so limited by the appended claims.

I claim as my invention:

1. An earth fertilizing tool, comprising a hollow handle, the interior of said handle constituting a storage chamber for granular fertilizer, the lower end of the handle having a discharge opening, valve means within and adjacent the lower end of said handle for controlling the discharge of fertilizer through said opening, and manually operable means for actuating said valve means, said manually operable means comprising a rod disposed within said handle and operably connected to said valve means, a reciprocably movable hand engaging member carried on the upper end of said handle, adapted in response to movement thereof for moving said rod and thereby actuating said valve means, and means for selectively locking said hand engaging member against valve means opening movement or positioning it for valve means opening movement comprising abutment and slot means wherein one slot means prevents valve opening movement of said hand engaging member and a longer slot means permits such movement.

2. An earth fertilizing tool, comprising a hollow handle, the interior of said handle constituting a storage chamber for granular fertilizer, the lower end of the handle having a discharge opening, valve means within and adjacent the lower end of said handle for controlling the discharge of fertilizer through said opening, and manually operable means for actuating said valve means, said manually operable means comprising a rod disposed within said handle and operably connected to said valve means, a hollow head, a sleeve connected therewith, depending therefrom and mounted for telescopic movement with respect to the upper end of said handle, said head being connected to the upper end of said rod whereby, in response to axial movement in one direction, it moves said rod and thereby actuates said valve means, the upper end of said head being outwardly flared to form a funnel for said hollow handle, and a removable closure for said head.

3. An earth fertilizing tool, comprising a hollow handle, the interior of said handle constituting a storage chamber for granular fertilizer, the lower end of the handle having a discharge opening, valve means within and adjacent the lower end of said handle for controlling the discharge of fertilizer through said opening, and manually operable means for actuating said valve means, said manually operable means comprising a rod disposed within said handle and operably connected to said valve means, and a movable hand engaging member carried on the upper end of said handle, adapted in response to movement thereof for moving said rod and thereby actuating said valve means, said valve means comprising a body fixedly mounted within said handle and having an axial bore and a port in the side wall of said body providing communication between said bore and said storage chamber of the handle, the upper end of said body being inclined to constitute a baffle for the fertilizer before it enters said port to prevent it from packing therein, and a pair of axially spaced apart valve members mounted on said rod within the bore of said body and normally positioned so as to open said port in the side wall of the body, and thereby forming a measuring chamber within said body, between said valve members, whereby movement of said rod, incident to movement of said hand engaging member, moves the valve members to a position for closing said port opening and simultaneously discharging the fertilizer from the measuring chamber.

4. An earth fertilizing tool, comprising a hollow handle, the interior of said handle constituting a storage chamber for granular fertilizer, the lower end of the handle having a discharge opening, valve means within and adjacent the lower end of said handle for controlling the discharge of fertilizer through said opening and manually operable means for actuating said valve means, said manually operable means comprising a rod disposed within said handle and operably connected to said valve means, and a movable hand engaging member carried on the upper end of said handle, adapted in response to movement thereof for moving said rod and thereby actuating said valve means, said valve means comprising a body fixedly mounted within said handle and having an axial bore and a port in the side wall of said body, said body having a portion of its side wall cut away to form in conjunction with the inner wall of the handle a restricted passageway for controlling the flow of fertilizer from the storage chamber of the handle through said port of the body into the interior of said body, and a pair of axially spaced apart valve members mounted on said rod within the bore of said body and normally positioned so as to open said port in the side wall of the body, and thereby forming a measuring chamber within said body, between said valve members, whereby movement of said rod, incident to movement of said hand engaging member, moves the valve members to a position for closing said port opening and simultaneously discharging the fertilizer from the measuring chamber.

5. An earth fertilizing tool, comprising a hollow handle, the interior of said handle constituting a storage chamber for granular fertilizer, the lower end of the handle having a discharge opening, valve means within and adjacent the lower end of said handle for controlling the discharge of fertilizer through said opening, and manually operable means for actuating said valve means, said manually operable means comprising a rod disposed within said handle and operably connected to said valve means, a movable hand engaging member carried on the upper end of said handle, adapted in response to movement thereof for moving said rod and thereby actuating said valve means, said valve means comprising a body fixedly mounted within said handle and having an axial bore and a port in the side wall of said body, said body having a portion of its side wall cut away to form in conjunction with the inner wall of the handle a restricted passageway for flow of fertilizer from the storage chamber of the handle through said port of the body into the interior of said body, a baffle member fixedly mounted in said handle above the valve body to constitute the bottom of the storage chamber, said storage chamber above said baffle member being in communication with said restricted passageway of the body, and a pair of axially spaced apart valve members mounted on said rod within the bore of said body and normally positioned so as to open said port in the side wall of the body, and thereby forming a measuring chamber within said body, between said valve members, whereby movement of said rod, incident to movement of said hand engaging member, moves the valve members to a position for closing said port opening and simultaneously discharging the fertilizer from the measuring chamber.

6. An earth fertilizing tool, comprising a hollow handle, the interior of said handle constituting a storage chamber for granular fertilizer, the lower end of the handle having a discharge opening, valve means within and adjacent the lower end of said handle for controlling the discharge of fertilizer through said opening, manually operable means for actuating said valve means, said manually operable means comprising a rod disposed within said handle and operably connected to said valve means, and a movable hand engaging member carried on the upper end of said handle, adapted in response to movement thereof for moving said rod and thereby actuating said valve means, said valve means comprising a body fixedly mounted within said handle, having an axial bore and a port in the side wall of said body and means providing communication adjacent one side of said hollow handle between said port and said storage chamber of the handle, a pair of axially spaced apart valve members mounted on said rod within the bore of said body and normally positioned so as to open said port in the side wall of the body, and thereby forming a measuring chamber within said body, between said valve members, whereby movement of said rod, incident to movement of said hand engaging member, moves the valve members to a position for closing said port opening and simultaneously discharging the fertilizer from the measuring chamber, spring means within said handle for yieldingly maintaining said rod at one position of adjustment and said valve members at said normal position, an opening in said hollow handle along said means providing communication, and a sleeve surrounding said hollow handle to cover said opening, said sleeve being movable to a position uncovering said opening to permit cleaning said valve means.

7. An earth fertilizing tool, comprising a hollow handle, the interior of said handle constituting a storage chamber for granular fertilizer, the lower end of the handle having a discharge opening, valve means within and adjacent the lower end of said handle for controlling the discharge of fertilizer through said opening, manually operable means for actuating said valve means, said manually operable means comprising a rod disposed within said handle and operably connected to said valve means, and a movable hand engaging member carried on the upper end of said handle, adapted in response to movement thereof for moving said rod and thereby actuating said valve means, the side of the hollow handle being formed with an aperture in registration with said valve means, and a sleeve movably mounted on said handle, normally positioned to cover said aperture and movable to a position out of registry therewith to permit of access to said valve means for cleaning fertilizer therefrom.

8. An earth fertilizing tool, comprising a hollow handle, the interior of said handle constituting a storage chamber for granular fertilizer, the lower end of the handle having a discharge opening, valve means within and adjacent the lower end of said handle for controlling the discharge of fertilizer through said opening, and manually operable means for actuating said valve means, said manually operable means comprising a rod disposed within said hollow handle and operably connected to said valve means, a head operably connected to said rod and having a sleeve portion mounted for telescopic movement on the upper end of said handle, and means for selectively limiting axial movement of said head relatively to said handle to one of insufficiency to open said valve means and another of sufficiency to open said valve means.

9. An earth fertilizing tool, comprising a hollow handle, the interior of said handle constituting a storage chamber for granular fertilizer, the lower end of the handle having a discharge opening, valve means within and adjacent the lower end of said handle for controlling the discharge of fertilizer through said opening, manually operable means for actuating said valve means, said manually operable means comprising a rod disposed within said hollow handle and operably connected to said valve means, a head having a sleeve portion mounted for telescopic movement on the upper end of said handle, means for limiting axial movement of said head and sleeve portion relatively to said handle, and selectively operable stop means for said head and sleeve portion for either actuating the rod and valve means in response to telescopic movement of said head on the handle or preventing such actuation.

10. An earth fertilizing tool, comprising a hollow handle, the interior of said handle constituting a storage chamber for granular fertilizer, the lower end of the handle having a discharge opening, valve means within and adjacent the lower end of said handle for controlling the discharge of fertilizer through said opening, manually operable means for actuating said valve means, said manually operable means comprising a rod disposed within said hollow handle and operably connected to said valve means, a head operably connected to said rod and having a sleeve portion mounted for telescopic movement on the upper end of said handle, slot and projection means for limiting axial movement of said head relatively to said handle, said slot means having a portion of one length to prevent valve means opening movement and a greater length portion to permit valve means opening movement, and spring means disposed within said handle and operably connected to said rod for yieldingly maintaining said valve means and said head at an inoperative position of adjustment.

References Cited in the file of this patent

UNITED STATES PATENTS

| | | |
|---|---|---|
| 74,231 | Lawson | Feb. 11, 1868 |
| 558,448 | Brown | Apr. 14, 1896 |
| 1,061,057 | Etheridge | May 6, 1913 |
| 1,303,141 | Younger | May 6, 1919 |
| 1,911,692 | Jalandoni | May 30, 1933 |
| 2,065,678 | Fish, Jr. | Dec. 29, 1936 |
| 2,090,532 | Hobbs | Aug. 17, 1937 |
| 2,370,744 | Molinare | Mar. 6, 1945 |
| 2,611,514 | Peyton | Sept. 23, 1952 |

FOREIGN PATENTS

| | | |
|---|---|---|
| 16,645 | Sweden | Nov. 14, 1903 |
| 19,014 | Sweden | Feb. 5, 1904 |
| 36,652 | Sweden | May 6, 1914 |
| 271,841 | Switzerland | Feb. 16, 1951 |